United States Patent
Earnshaw

(10) Patent No.: US 10,578,807 B2
(45) Date of Patent: Mar. 3, 2020

(54) OPTICAL APPARATUS WITH PAIRED INPUT AND OUTPUT PLANAR WAVEGUIDES COUPLED TO A REFLECTIVE MODULATOR

(71) Applicant: Alcatel-Lucent USA Inc., Murray Hill, NJ (US)

(72) Inventor: Mark P. Earnshaw, Murray Hill, NJ (US)

(73) Assignee: Nokia of America Corporation, Murray Hill, NJ (US)

(*) Notice: Subject to any disclaimer, the term of this patent is extended or adjusted under 35 U.S.C. 154(b) by 0 days.

(21) Appl. No.: 15/445,099

(22) Filed: Feb. 28, 2017

(65) Prior Publication Data

US 2018/0248632 A1 Aug. 30, 2018

(51) Int. Cl.
| | |
|---|---|
| *H04B 10/516* | (2013.01) |
| *H04B 10/50* | (2013.01) |
| *G02B 6/36* | (2006.01) |
| *G02B 6/42* | (2006.01) |
| *G02B 6/125* | (2006.01) |
| *G02B 6/30* | (2006.01) |

(Continued)

(52) U.S. Cl.
CPC .......... *G02B 6/32* (2013.01); *G02B 6/125* (2013.01); *G02B 6/12016* (2013.01); *G02B 6/30* (2013.01); *G02B 6/4206* (2013.01); *H04B 10/505* (2013.01); *G02B 2006/12142* (2013.01)

(58) Field of Classification Search
CPC ...... H04B 10/516; H04B 10/501; G02B 6/32; G02B 6/4206; G02B 6/125; G02B 6/30; G02B 6/12016; G02B 2006/12142
See application file for complete search history.

(56) References Cited

U.S. PATENT DOCUMENTS

| | | | | |
|---|---|---|---|---|
| 5,037,173 | A | * 8/1991 | Sampsell | G02B 6/262 385/17 |
| 6,014,237 | A | 1/2000 | Abeles et al. | |
| 6,263,127 | B1 | 7/2001 | Dragone et al. | |

(Continued)

FOREIGN PATENT DOCUMENTS

EP    2 763 341 A1    6/2014

OTHER PUBLICATIONS

Zhou, et al.; "25-GHz-Spaced DWDM-PON With Mitigated Rayleigh Backscattering and Back-Reflection Effects"; IEEE photonics Society; IEEE Photonics Journal; vol. 5, No. 4; Aug. 2013; 8 pgs.

(Continued)

*Primary Examiner* — Leslie C Pascal

(57) ABSTRACT

An optical apparatus comprising a reflective optical modulator and an integrated planar lightwave circuit. The circuit can have one or more pairs of input and output planar waveguides thereon. The input planar waveguide is optically coupleable to a first optical fiber and the output optical waveguide is optically coupleable to a second optical fiber. End segments of the input planar waveguide and the output planar waveguide are tilted towards each other such that the input planar waveguide is able to direct an optical signal from the planar lightwave circuit to a reflective modulator. The reflective optical modulator is configured to data modulate the optical signal and transmit said data modulated optical signal to the end segment of the output planar waveguide.

31 Claims, 9 Drawing Sheets

(51) Int. Cl.
*G02B 6/12* (2006.01)
*G02B 6/32* (2006.01)

(56) References Cited

U.S. PATENT DOCUMENTS

| | | | |
|---|---|---|---|
| 6,934,445 | B1* | 8/2005 | Leaird ................ G02B 6/12019 385/1 |
| 8,606,106 | B2 | 12/2013 | Healey et al. |
| 2003/0118286 | A1* | 6/2003 | Kamei ................ G02B 6/12019 385/37 |
| 2003/0165173 | A1 | 9/2003 | Helbing et al. |
| 2006/0146855 | A1 | 7/2006 | Kani et al. |
| 2007/0280577 | A1* | 12/2007 | Lu ......................... G02F 1/3132 385/1 |
| 2011/0217039 | A1 | 9/2011 | Smith |
| 2014/0093244 | A1 | 4/2014 | Zheng et al. |
| 2015/0063803 | A1 | 3/2015 | Ciaramella et al. |

OTHER PUBLICATIONS

Goossen, et al.; "Interleaved-Contact Electroabsorption Modulator Using Doping-Selective Electrodes with 25 (degree) C to 95 (degree) C Operating Range"; IEEE Photonics Technology Letters, vol. 5, No. 2; Feb. 1993; pp. 181-183.

Boyd, et al.; "Multiple quantum well reflection modulator"; Appl. Phys Lett., vol. 50, No. 17; 1987 American Institute of Physics; Apr. 27, 1987; pp. 1119-1121.

Neilson; "Optimization and Tolerance Analysis of QCSE Modulators and Detectors"; IEEE Journal of Quantum Electronics; vol. 33, No. 7; Jul. 1997; pp. 1094-1103.

Timurdogan, et al.; "An ultralow power athermal silicon modulator"; Nature Communications; DOI: 10.1038/ncomms5008; Published Jun. 11, 2014; pp. 1-11.

Xiong, et al.; "A monolithic 56 Gb/s silicon photonic pulse-amplitude modulation transmitter"; Optica; vol. X, No. X; Aug. 29, 2016; pp. 1-6.

Miller, et al.; "Band-Edge Electroabsorption in Quantum Well Structures: The Quantum-Confined Stark Effect"; American Physical Society; Physical Review Letters; vol. 53, No. 22, Nov. 26, 1984; pp. 2173-2176.

Besten, et al.; "Integration of MZI modulators and AWG-based multiwavelength lasers in InP"; Proceedings Symposium IEEE/LEOS Benelux Chapter; 2004; pp. 95-98.

Lawniczuk, et al.; "Design of integrated photonic transmitter for application in Fiber-to-the-Home systems"; Photonics Applications in Astronomy, Communications, Industry, and High-Energy Physics Experiments; 2010; 7 pgs.

Lawniczuk, et al.; "AWG-Based Photonic Transmitter With DBR Mirrors and Mach-Zehnder Modulators"; IEEE Photonics Technology Letters; vol. 26 No. 7; Apr. 1, 2014; pp. 710-713.

* cited by examiner

OPTICAL APPARATUS WITH PAIRED INPUT AND OUTPUT PLANAR WAVEGUIDES COUPLED TO A REFLECTIVE MODULATOR

TECHNICAL FIELD

This application is directed, in general, to optical communications apparatuses and systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Reflective optical modulators have advantages in fabrication simplicity and high speed due to small capacitance footprint. However, optical coupling with an optical apparatus with low loss can be difficult due to the use of lenses and an optical circulator. The cost of these components also increase the overall cost of the optical package even though the modulator itself is inexpensive. Often a fiber with a gradient-index lens, or a pair of lenses, is used to image the fiber mode to the modulator device, with the input light and/or reflected modulated light beams being separated by a bulky and expensive optical circulator.

SUMMARY OF ILLUSTRATIVE EMBODIMENTS

One embodiment is an optical apparatus, comprising a reflective optical modulator and an integrated planar lightwave circuit. The circuit can have one or more pairs of input and output planar waveguides thereon. The input planar waveguide is optically coupleable to a first optical fiber and the output optical waveguide is optically coupleable to a second optical fiber. End segments of the input planar waveguide and the output planar waveguide are tilted towards each other such that the input planar waveguide is able to direct an optical signal from the planar lightwave circuit to a reflective modulator. The reflective optical modulator is configured to data modulate the optical signal and transmit said data modulated optical signal to the end segment of the output planar waveguide.

In some such embodiments non-end segment portions the input planar waveguide and the output planar waveguide are separated by a distance in the range from 100 to 500 microns. In some such embodiments the end segments of the input planar waveguide and the output planar waveguide are tilted towards each other to form an acute angle therebetween. In some such embodiments ends of the end segments of the input planar waveguide core and the output planar waveguide core of one of the one or more pairs are offset by a distance in the range from about 0.1 to 1 microns. In some such embodiments, ends of the end segments of the input planar waveguide core and of the output planar waveguide core one of the one or more pairs are in contact with each other at an edge of the planar lightwave circuit. Any such embodiments can further include a pair of lens configured to image the optical signal from the end of the titled end segment of input planar waveguide into the reflective modulator and to image the data modulated optical signal from the reflective optical modulator onto the end of the titled end segment of the output planar waveguide of the same one of the one or more pairs. Any such embodiments can further include a pair of lens configured to image the optical signal from the end of the titled end segment of input planar waveguide on to the reflector of the reflective modulator and to image the data modulated optical signal from the reflector on to the end of the titled end segment of the output planar waveguide. In some such embodiments, the reflective optical modulator is an electro-absorptive modulator.

Any such embodiments can further include a cyclic arrayed waveguide grating wherein each of the input planar waveguides is optically coupled to a free space region of the cyclic arrayed waveguide grating and each of the output planar waveguides is optically to a multimode region of the cyclic arrayed waveguide grating. In some such embodiments, the optical signal is a wavelength division multiplexed optical signal and the cyclic arrayed waveguide grating is configured to separate the wavelength division multiplexed optical signal into demultiplexed wavelength channel optical signals that are each directed to different ones of the second input waveguide portions of the pairs, and the data modulated forms of the demultiplexed wavelength channel optical signals are reflected to different ones of the second output planar waveguide portion of the same pairs. In some such embodiments the multimode region of the cyclic arrayed waveguide grating has first and second port pairs respectively coupled to one of the pairs the second input waveguide and the second output waveguide portions.

Another embodiment is another optical apparatus. The apparatus can comprise a planar lightwave circuit having one or more pairs of input and output planar waveguides thereon. The input planar waveguide can be optically coupleable to a first optical fiber and the output optical waveguide can be optically coupleable to a second optical fiber. End segments of the input planar waveguide and the output planar waveguide can be tilted towards each other such that an optical signal passed through the input planar waveguide is directed from the planar lightwave circuit to a reflector of a reflective modulator. The reflector can be configured to reflect a data modulated form of the optical signal to the end segment of the output planar waveguide and through the output planar waveguide.

For some embodiments of the apparatus, non-end segment portions the input planar waveguide and the output planar waveguide can be separated by a distance in the range from 100 to 500 microns. In some embodiments, the end segments of the input planar waveguide and the output planar waveguide can be tilted towards each other to form an acute tilt angle. In some embodiments, ends of the end segments of the input planar waveguide and the output planar waveguide can be offset by a distance in the range from about 0.1 to 1 microns. In some embodiments, ends of the end segments of the input planar waveguide and of the output planar waveguide can be in contact with each other at an edge of the planar lightwave circuit.

Any embodiments of the apparatus can further include a lens configured to focus the optical signal from the end of the titled end segment of input planar waveguide to the reflector of the reflective modulator and to focus the data modulated optical signal from the reflector to the end of the titled end segment of the output planar waveguide. Any such embodiments of the apparatus can further include a pair of lens configured to image the optical signal from the end of the titled end segment of input planar waveguide on to the reflector of the reflective modulator and to image the data modulated optical signal from the reflector on to the end of the titled end segment of the output planar waveguide. In any embodiments of the apparatus, the reflective modulator can be an electro-absorptive modulator.

Some embodiments of the apparatus can further include one or more of the input planar waveguides. Each of the input planar waveguides can include a first input waveguide portion having one end coupleable to the first optical fiber and an opposite end coupled to a port of a free space region of a cyclic arrayed waveguide grating. Each of the input planar waveguides can include second input waveguide portions each having one end coupled to a different port of a multimode region of the cyclic arrayed waveguide grating and the opposite ends each optically coupled to different reflectors of the reflective modulator. Some embodiments of the apparatus can further include one or more of the output planar waveguides. Each of the output planar waveguides can include a first output waveguide portion having one end coupleable to the second optical fiber and an opposite end coupled to a different port of the free space region. Each of the output planar waveguides can include second output waveguide portions each having one end coupled to a different port of the multimode region and an opposite end coupled to one of the different reflectors. The opposite ends of the pairs of the second input waveguide portions and the second output planar waveguide portions can be tilted towards each other such that for each of the pairs, the optical signal passing through the second input waveguide portion of the pair is directed from the planar lightwave circuit to the one reflector and from the one reflector to the second output waveguide portion of the pair.

In any such embodiments, the optical signal can be a wavelength division multiplexed optical signal and the cyclic arrayed waveguide grating can be configured to separate the wavelength division multiplexed optical signal into demultiplexed wavelength channel optical signals that are each directed to different ones of the second input waveguide portions of the pairs. In some such embodiments, the data modulated forms of the demultiplexed wavelength channel optical signals can be reflected to different ones of the second output planar waveguide portion of the pairs.

In any such embodiments, the multimode region of the cyclic arrayed waveguide grating can be configured to have port spacings separated from each other by a constant frequency difference, $\Delta f$, and, the wavelength division multiplexed optical signal can be separated from each other by a constant frequency difference $2\Delta f$. In any such embodiments, the multimode region of the cyclic arrayed waveguide grating can have first and second port pairs respectively coupled to one of the pairs the second input waveguide and the second output waveguide portions. In any such embodiments, the one or more ports of the free space region can be configured to have a narrow band pass. In any such embodiments, the one or more ports of the multimode region are configured to have a wide band pass.

Another embodiment is an optical system comprising a package substrate, a reflective optical modulator mounted on the package substrate and an integrated planar lightwave circuit mounted on the package substrate. The planar lightwave circuit has an input planar waveguide and an output planar waveguide thereon. The input planar waveguide is optically coupleable to one or more first optical fibers and the output planar waveguide is optically coupleable to one or more second optical fibers. End segments of the input planar waveguide and the output planar waveguide are tilted towards each other such that an optical signal passed through the input planar waveguide is directed from the planar lightwave circuit into the reflective optical modulator configured to data modulate the optical signal and direct said data modulated optical signal to the end segment of the output planar waveguide.

In some such embodiments, the first and second optical fibers are mounted on the package substrate. In some such embodiments, the reflective optical modulator is an electro-absorptive modulator having an array of the reflectors. Any such embodiments can further include a control module on the package, the control module being configured to electrically drive the data modulation of the optical signal by reflective optical modulator. Any such embodiments, can further include a lens array, each lens of the lens array is configured to focus or image a different channel of the optical signal from one of the second portions of the input waveguide onto one of the reflectors of the reflective modulator. Any such embodiments can further include a cyclic arrayed waveguide grating wherein each of the input planar waveguides is optically coupled to a free space region of the cyclic arrayed waveguide grating and each of the output planar waveguides is optically to a multimode region of the cyclic arrayed waveguide grating.

Another embodiment is another optical system that can comprise a package substrate, a reflective modulator mounted on the package substrate and a planar lightwave circuit mounted on the package substrate. The planar lightwave circuit can have an input planar waveguide and an output planar waveguide thereon. The input planar waveguide can be optically coupleable to one or more first optical fibers and the output planar waveguide can be optically coupleable to one or more second optical fibers. End segments of the input planar waveguide and the output planar waveguide can be tilted towards each other such that an optical signal passed through the input planar waveguide is directed from the planar lightwave circuit to a reflector of a reflective modulator. The reflector can be configured to reflect a data modulated form of the optical signal to the end segment of the output planar waveguide and through the output planar waveguide.

In any embodiments of the system, the first and second optical fibers can be mounted on the package substrate. In any embodiments of the system, the reflective modulator can be an electro-absorptive modulator having an array of the reflectors. Any embodiments of the system can further include a control module on the package that can be configured to control the modulation of the optical signal by reflective modulator. Any embodiments of the system can further include a lens array. Each lens of the lens array can be configured to focus or image a different channel of the optical signal from one of the second portions of the input waveguide onto one of the reflectors of the reflective modulator.

Any embodiments of the system can further include a cyclic arrayed waveguide on the planar lightwave circuit, one or more of the input planar waveguides and one or more of the output planar waveguides. Each of the input planar waveguides can include a first input waveguide portion having one end coupleable to the first optical fiber and an opposite end coupled to a port of a free space region of the cyclic arrayed waveguide grating. Each of the input planar waveguides can include second input waveguide portions each having one end coupled to a different port of a multimode region of the cyclic arrayed waveguide grating and the opposite ends each optically coupled to different reflectors of the reflective modulator. Each of the output planar waveguides can include a first output waveguide portion having one end coupleable to the second optical fiber and an opposite end coupled to a different port of the free space region. Each of the output planar waveguides can include second output waveguide portions each having one end coupled to a different port of the multimode region and an opposite end coupled to one of the different reflectors. The opposite ends of the pairs of the second input waveguide portions and the second output planar waveguide portions can be tilted towards each other such that for each of the pairs, the optical signal passing through the second input waveguide portion of the pair is directed from the planar lightwave circuit to the one reflector and from the one reflector to the second output waveguide portion of the pair.

BRIEF DESCRIPTION OF THE DRAWINGS

Reference is now made to the following descriptions taken in conjunction with the accompanying drawings, in which.

In the Figures and text, similar or like reference symbols indicate elements with similar or the same functions and/or structures.

In the Figures, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION

The description and drawings merely illustrate the principles of the inventions. It will thus be appreciated that those skilled in the art will be able to devise various arrangements that, although not explicitly described or shown herein, embody the principles of the inventions and are included within its scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Embodiments of the disclosure use a pair, or pairs, of waveguides integrated on a planar lightwave circuit (PLC) to provide efficient optical coupling to and from a reflective optical modulator, without the need for an optical circulator and, in some embodiments, with no focusing optics needed. The simplicity of the resulting optical apparatus can provide significant cost and/or size advantages over optical apparatuses that use expensive and/or bulky circulators and lens.

Figure 1:
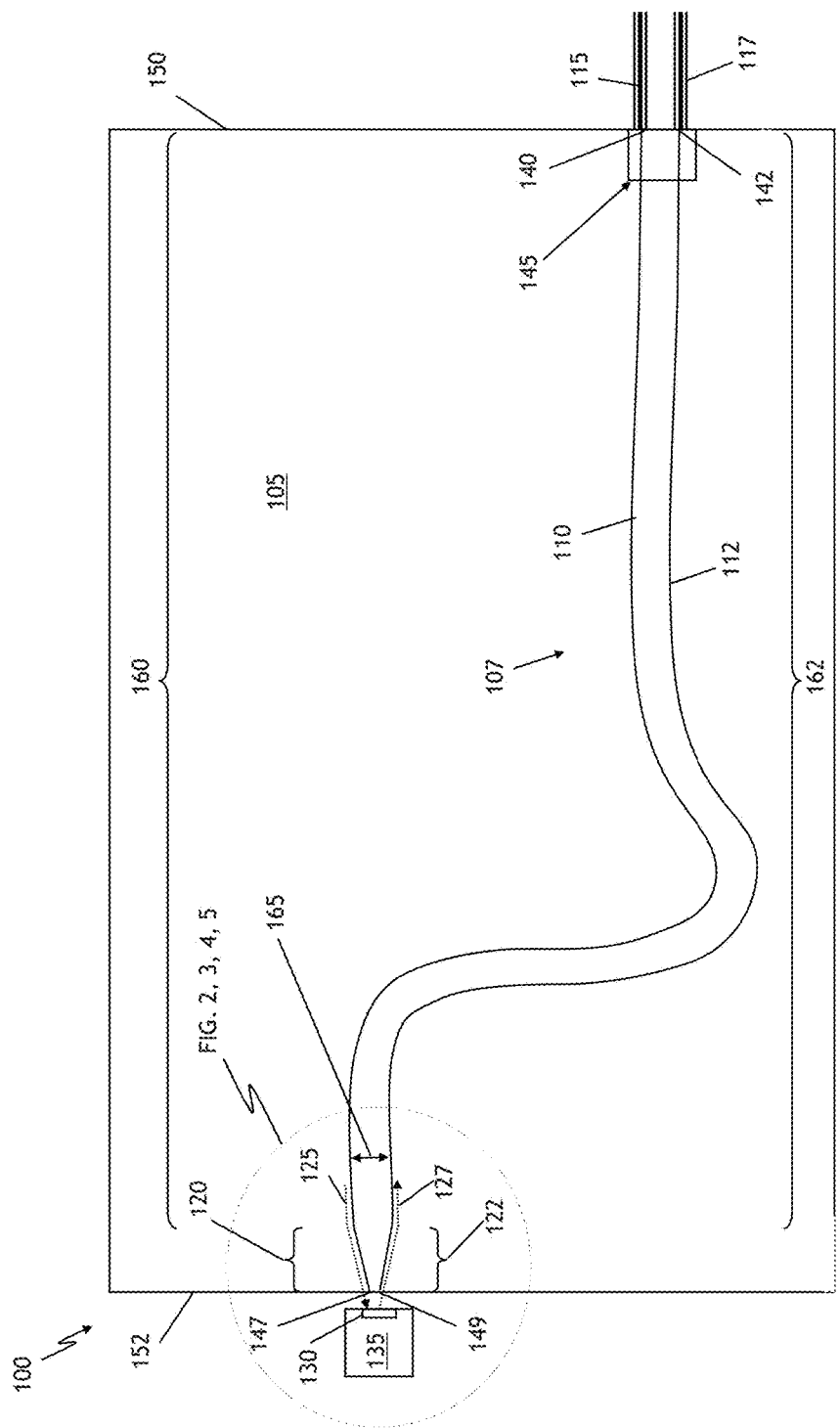
FIG. 1 presents a plan view of an example embodiment of an optical apparatus of the disclosure.

FIG. 1 presents a plan view of an example embodiment of an optical apparatus 100 of the disclosure.

The apparatus 100 comprises a planar lightwave circuit 105 having one or more pairs of input and output planar waveguides thereon (e.g., pair 107 having input planar waveguides, 110 and output planar waveguides 112). The input planar waveguide 110 is optically coupleable to a first optical fiber (e.g., fiber 115) and the output optical waveguide is optically coupleable to a second optical fiber (e.g., fiber 117).

End segments of the input planar waveguide 110 (e.g., segment 120) and the output planar waveguide 112 (e.g., segment 122) are tilted towards each other such that an optical signal (e.g., optical signal 125) passed through the input planar waveguide 110 (e.g., from the first optical fiber 115) is directed from the planar lightwave circuit 105 to a reflector 130 (e.g., a reflecting facet) of a reflective modulator 135, the reflector 130 is configured to reflect a data modulated form of the optical signal (e.g., 127) to the end segment 122 of the output planar waveguide 112 (e.g., through the output planar waveguide 112 to the second optical fiber 117).

In some embodiments, as illustrated in FIG. 1, one end 140 of the input planar waveguide 110 can be end-coupled (e.g., via input/output coupling ports 145) to the first optical fiber 115, and, one end 142 of the output optical waveguide 112 can be end-coupled to a second optical fiber, and, the opposite ends of the waveguides 147, 147 are the terminal ends of the end segments 120, 122 that are tilted towards each other. In other embodiments, however, one or both of the planar waveguides 110, 112 can be optically coupled to the optical fibers 112, 115 via vertical optical grating couplers, free-space lens, turning mirrors or other coupling mechanisms familiar to those skilled in the pertinent arts.

As illustrated in FIG. 1, in some embodiments, the input and the output planar waveguide 110, 112 are routed across the planar lightwave circuit 105 from one edge 150 of the PLC 105, where they are end-coupled to the optical fiber 115, 117, on another edge 152 of the circuit 105 where the terminating ends 147, 149 face the reflector 130. In other embodiments, however, the input and the output planar waveguide 110, 112 can be coupled to the same edge 150 of the PLC 105 that is coupled are end-coupled the optical fiber 115, 117, or two other edges of the circuit 150, depending upon the constraints of the optical transmitter package that the apparatus 100 is to be incorporated into.

Embodiments of the planar waveguides 110, 112 can be made from any high-index-contrast material and can be formed as ridge or buried waveguides on or in, e.g., silicon, silicon-nitride, or indium phosphide PLC chips. For clarity, only the core portions of the waveguides 110, 112 are depicted in the figures.

The tilted end segments 120, 122 have a sufficient length to facilitate efficient injection of the optical signal 125 out of the waveguide to the reflector 130. In some embodiments, e.g., the end-segments 120, 122 have a length of at least about 1 micron, and in some embodiments from 1 to 10000 microns. End segment lengths of greater than 10000 microns may not be conducive to having a compact apparatus embodiment or may allow undesired amounts of optical coupling between the waveguides 110, 112.

The non-end segment portions of the input and the output planar waveguide 110, 112 (e.g., segments 160, 162 including ends 140, 142) are separated by a distance sufficiently far that the mode of the optical signal in one waveguide core (e.g., signal 125 in waveguide 110) does not couple into the other waveguide core and thereby interfere with the optical signal in the other waveguide (e.g., signal 127 in waveguide 112). For example in some embodiments, the non-end segment portions 160, 162 of the input and the output planar waveguide 110, 112 are separated by a distance 165 of at least about 100 microns, and in some embodiments, a distance 185 in a range from about 100 to 300 microns, and in some embodiments about 127 microns or about 250 microns.

FIGS. 2-5 present a detailed view of a portion of various embodiments of the optical apparatus 100 similar to the optical apparatus 100 shown in FIG. 1.

Figure 2:
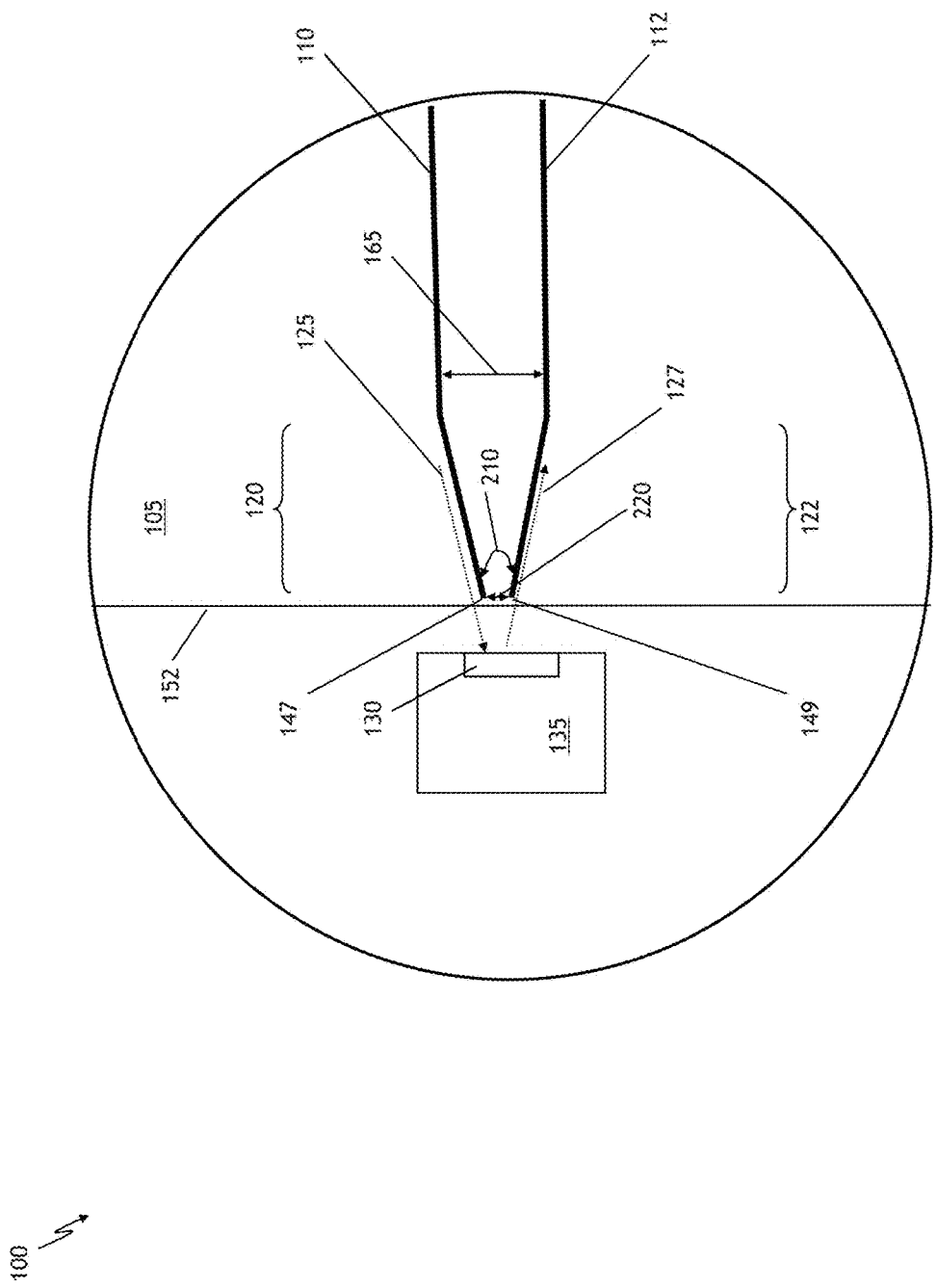
FIG. 2 presents a detailed view of a portion of one embodiment of an optical apparatus of the disclosure similar to the optical apparatus shown in FIG. 1.

As illustrated in FIG. 2, in some embodiments, the end segments 120, 122 of the input and the output planar waveguide 110, 112 are tilted towards each other to form an acute tilt angle 210. In some embodiments, the tilt angle 210 is in a value in a range from about 1 to 20 degrees, and in some embodiments from about 8 to 10 degrees. Using shallow angles (e.g., tilt angles 210, of about 1 to 5 degrees can be conducive to forming a more compact apparatus and can facilitated the efficient capture of light (e.g., of the modulated optical signal 127) reflected by the reflector 130. At too shallow a tilt angle 210 (e.g., less than 1 degree), however, there may be undesirable optical coupling at the ends of 147, 149 of the waveguides 110, 112 such that, e.g. portions of the reflected signal 127 goes to the input waveguide 110 instead of the output waveguide 112. At a steeper tilt angle 210 (e.g., greater than 10 degrees), there may be reduced coupling efficiency of the optical signal 125 from the input waveguide 110 to the reflector 130 or of the modulated optical signal 127 from the reflector 130 to the output waveguide 112. For instance, there may be polarization dependent reflections in metals that can reduce the coupling efficiency into the output waveguide 112. One skilled in the art would understand how precise optimal tilt angles will depend on the material and waveguide numerical aperture used.

As further illustrated in FIG. 2, in some embodiments, the ends 147, 149 of the tilted end segments 120, 122 are offset from each other. In some embodiments, e.g., the nearest edges of the waveguide cores of the waveguides 110, 112 are off set by a distance 220 the range from about 0.1 to 10 microns and in some embodiments 0.1 to 1 microns or 1 to 3 microns or 4 to 7 microns of 7 to 10 microns. Having the ends 147, 149 separated by the offset distance 220 can help reduce above-described undesirable optical coupling between the waveguides 110, 112 and/or can facilitate setting a tilt angle 210 in a desirable range so as to efficiently direct the optical signal 125 to the reflector 130, e.g., when the reflective modulator 135 is offset from the edge 152 of the PLC 105.

Figure 3:
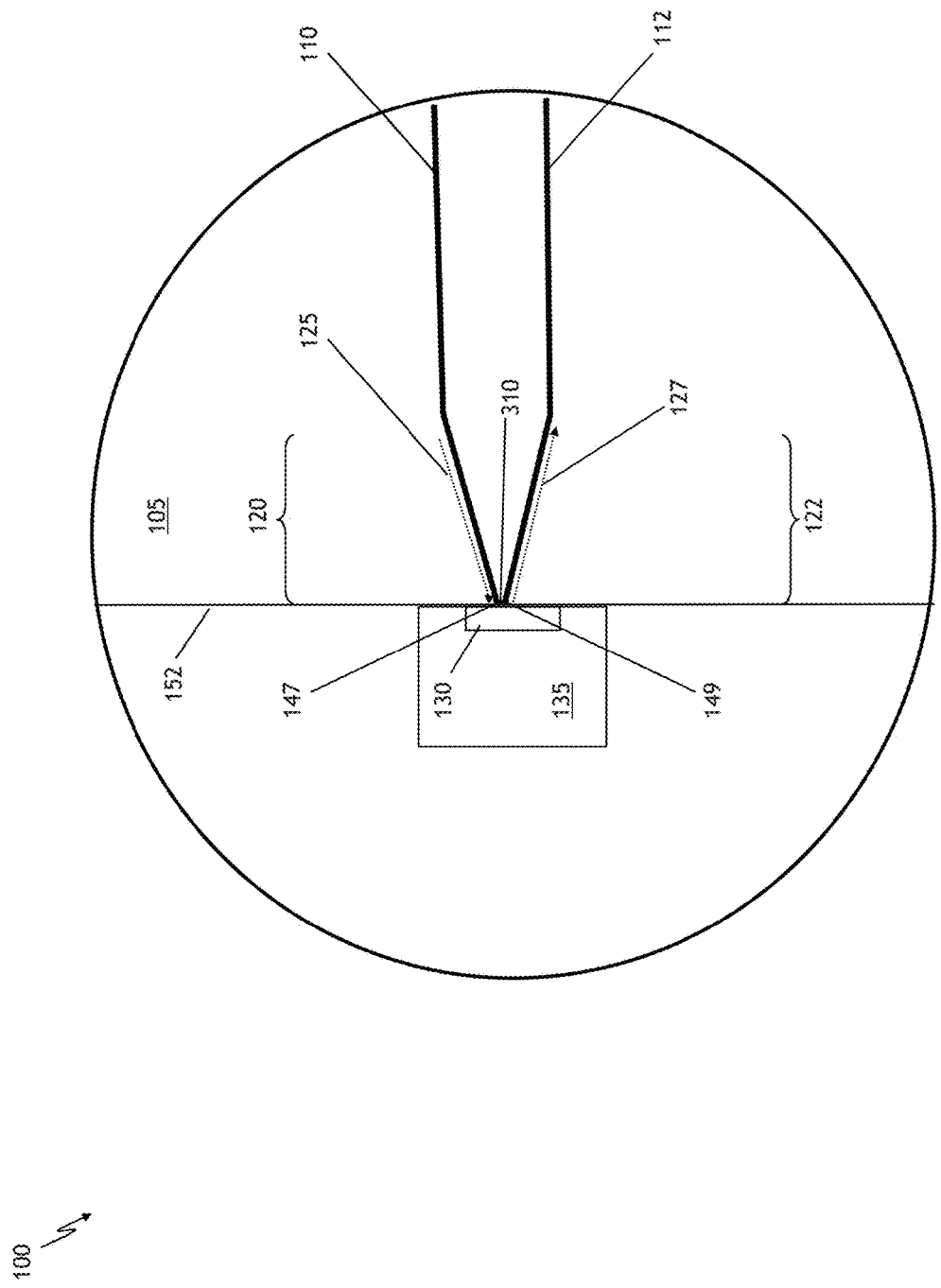
FIG. 3 presents a detailed view of a portion of another embodiment of an optical apparatus of the disclosure similar to the optical apparatus shown in FIG. 1.

As illustrated in FIG. 3, in some embodiments, the ends 147, 149 of the tilted end segments 120, 122 are in contact at an edge 152 of the planar lightwave circuit 105. For instance, the nearest edges of the waveguide cores of the waveguides 110, 112 can contact each other to form a core slab portion 310 at the edge 152 of the planar lightwave circuit 105. Such embodiment may facilitate the efficient coupling of the optical signals 125, 127 to and from a reflector 130 that is situated at the edge 152 of the PLC 105 (e.g., within about 1 micron of the edge 152, or within about 0.1 microns of the edge 152, in some embodiments).

Figure 4:
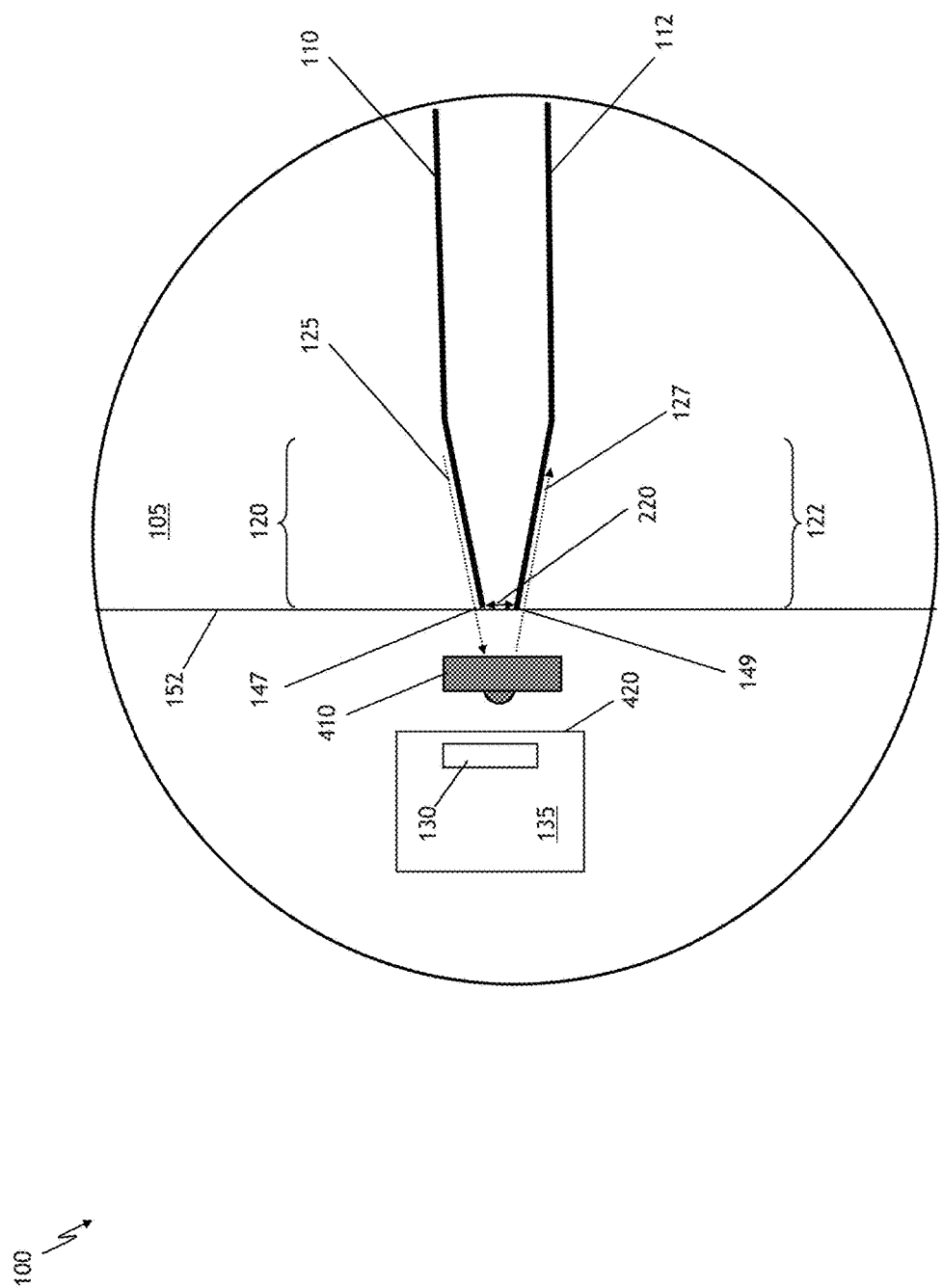
FIG. 4 presents a detailed view of a portion of another embodiment of an optical apparatus of the disclosure similar to the optical apparatus shown in FIG. 1.

As illustrated in FIG. 4, in some embodiments, the apparatus 100 further includes a lens (e.g., a convex lens 410) configured to focus the optical signal 125 from the end 147 of the titled end segment 120 of input planar waveguide 110 to the reflector 130 of the reflective modulator 135, and, to focus the reflected data modulated optical signal 127 from the reflector 130 to the end 149 of the titled end segment 122 of the output planar waveguide 112. Situating a lens 410 between the edge 152 of the PLC 105 and the reflective modulator 135 can facilitate efficient optical coupling, e.g., when the reflective modulator 135 is offset from the edge 152 of the PLC (e.g., 10s or 100s of microns offset) and/or the reflector 130 is buried and not at the surface 410 of the reflective modulator 135 and/or the ends 147, 149 of the titled end segments 120, 122 are separated (e.g., by separation distance 220, to reduce undesirably optical coupling).

Figure 5:
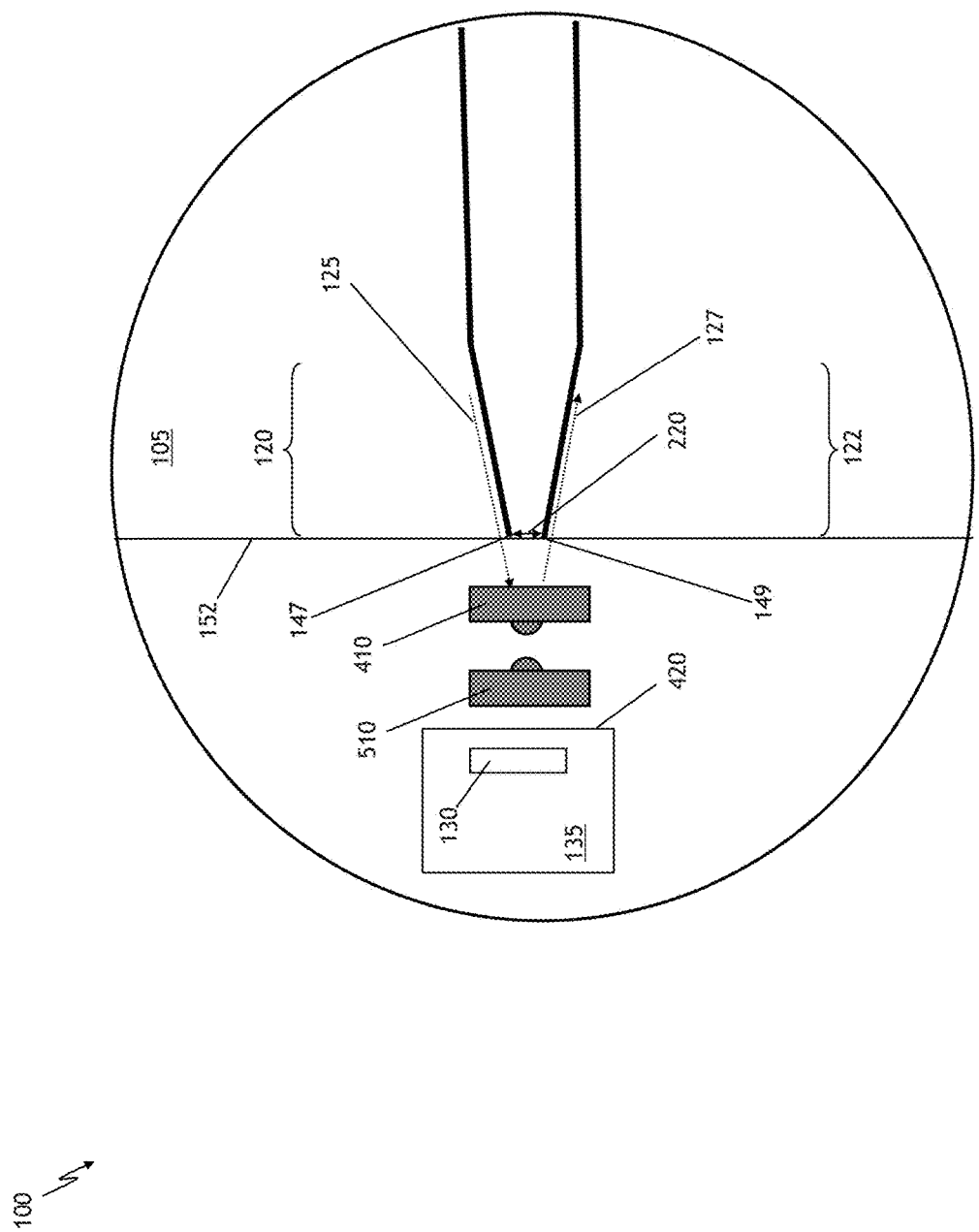
FIG. 5 presents a detailed view of a portion of another embodiment of an optical apparatus of the disclosure similar to the optical apparatus shown in FIG. 1.

Similarly, as illustrated in FIG. 5, in some embodiments, the apparatus 100 further includes a pair of lens (e.g., opposing convex lenses 410, 510) configured to image the optical signal (e.g., reproduce the optical beam 125) from the end 147 of the titled end segment 120 of input planar waveguide 110 onto the reflector 130 of the reflective modulator 135, and, to image the reflected data modulated optical signal (e.g., reproduce the modulated optical signal 127) from the reflector 130 onto the end 149 of the titled end segment 122 of the output planar waveguide 112.

In some embodiments, to facilitate providing a reflector that can be placed at or near the edge 152 of the PLC 105 (e.g., reflector 130 of reflective modulator 135, FIG. 1), the optical reflective modulator can be an electro-absorptive modulator. One skilled in the pertinent art would be familiar how to construct such modulators so that the reflector includes a multi-quantum well region (e.g., multi-quantum well layers between InP layers) whose absorption/reflectivity at a target channel wavelength can be altered by an applied electric field. Some electro-absorptive modulators can also provide advantages of reduced power consumption, less complexity of manufacture, or faster operating speeds, e.g., as compared to some MEMS based reflective modulators.

The optical signal 125 can be CW light in any wavelength band used in optical communications, e.g., including the Original (e.g., about 1260 to about 1360 nm), Extended (e.g., about 1360 to about 1460 nm), Short (e.g., about 1460 to about 1530 nm), Conventional (C-band, e.g., about 1530 to about 1565 nm), Long (from e.g., 1565 to about 1625 nm) or Ultralong (e.g., about 1625 to about 1675 nm) bands. In various embodiments, the optical signal 125 can include one or more channels that can be separated by a characteristic spacing $\Delta f$, corresponding to a regular, even spacing of frequency components by a same frequency difference, e.g., about 100 GHz, 50 GHz, 25 GHz or 10 GHz.

The data modulated form of the optical signal 127 can be modulated by phase, intensity and/or polarization modulation to impart data into the reflected signal 127 to carry the data by any modulation technique familiar to those skilled in the pertinent art, e.g., BPSK, QPSK, 8PSK, QAM, OOK, etc.

Figure 6:
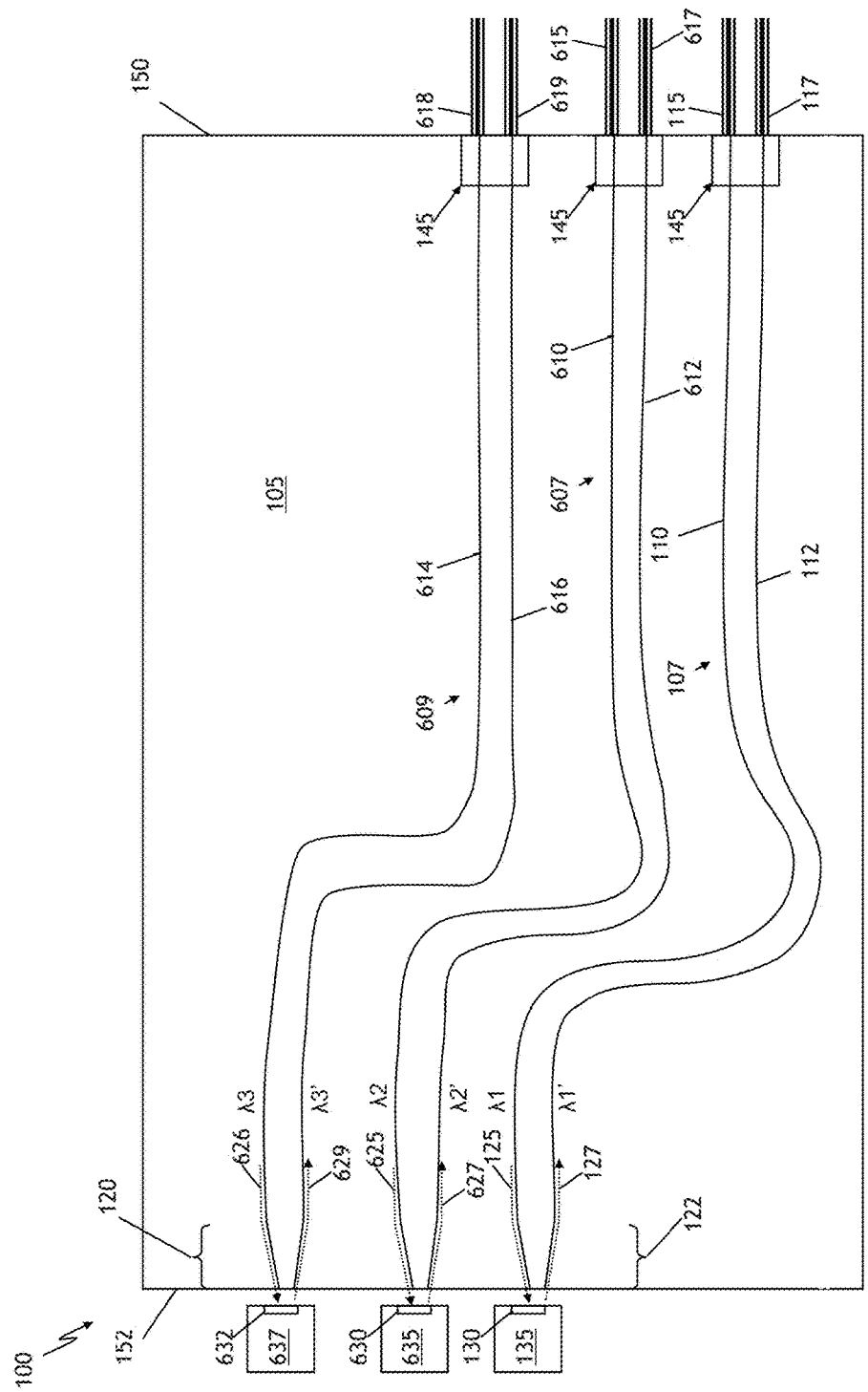
FIG. 6 presents a plan view of another example embodiment of an optical apparatus of the disclosure.

FIG. 6 presents a plan view of another example embodiment of the optical apparatus 100 showing multiple pairs 107, 607, 609 of input and output waveguides 110, 112, 610, 612, 614, 616 on the PLC 105. Each of the pairs of waveguides can be configured according to any of the embodiments discussed in context of FIGS. 1-5.

For instance, each of the pairs 107, 607, 609 of input and output waveguides 110, 112, 610, 612, 614, 616 can have end segments 120, 122 tilted towards each other such that different ones of the optical signals 125, 625, 626 (e.g., each carrying different channels $\lambda 1$, $\lambda 2$, $\lambda 3$, respectively) passing through different ones of the input planar waveguides 110, 610, 614 are directed from the PLC 105 to different ones of reflectors 130, 630, 632 of different ones of reflective modulators 135, 635, 637. For instance, each of the reflectors 130, 630, 632 can be configured to reflect a data modulated form of the optical signals 127, 627, 629 (e.g., data modulated channels $\lambda 1'$, $\lambda 2'$, $\lambda 3'$, respectively), to the end segment 122 and through the output planar waveguide 112, 612, 616 of the pair 107, 607, 609. For instance, each of the input planar waveguides 110, 610, 614 can be optically coupleable to different ones of first optical fibers 115, 615, 618 (e.g., each carrying different ones of the channels $\lambda 1$, $\lambda 2$, $\lambda 3$) and the output optical waveguide 112, 612, 616 can be optically coupleable to different ones of second optical fibers 117, 617, 618 (e.g., each carrying different ones of the data modulated channels $\lambda 1'$, $\lambda 2'$, $\lambda 3'$).

Figure 7:
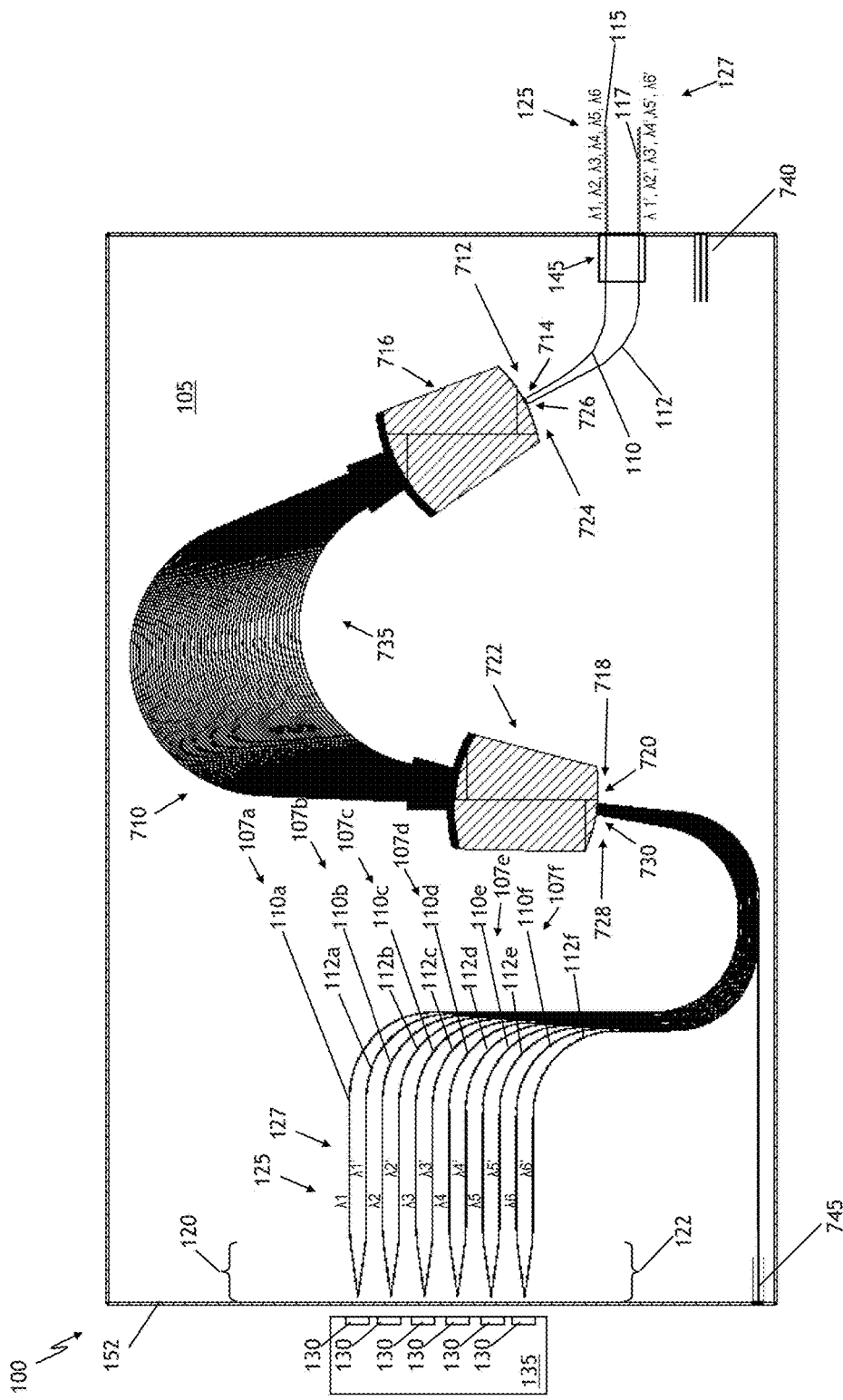
FIG. 7 presents a plan view of another example embodiment of an optical apparatus of the disclosure.

FIG. 7 presents a plan view of another example embodiment of the optical apparatus 100 including a cyclic arrayed waveguide grating (cAWG) 710 integrated with pairs planar input and output waveguides to e.g., facilitate carrying multiple wavelength channels to an reflective modulator 135 having an array of different reflectors 130.

Such apparatus embodiments, configured with a cAWG, benefit from recognition, as part of the present disclosure, that the cyclicity properties of a cAWG can facilitate extending the apparatus 100 to receive multiple wavelength channels (e.g., channels $\lambda 1$, $\lambda 2$, $\lambda 3$, $\lambda 4$, $\lambda 5$, $\lambda 6$), with appropriate channel spacings, from the first fiber 115 and transmit data modulated form of those channels to the second fiber 117 (e.g., $\lambda 1'$, $\lambda 2'$, $\lambda 3'$, $\lambda 4'$, $\lambda 5'$, $\lambda 6'$).

As shown in FIG. 7, the apparatus 100 includes one or more of the input planar waveguides, wherein each of the input planar waveguides include a first input waveguide portion (e.g., waveguide portion 110) having one end (e.g., analogous to end 140 shown in FIG. 1) coupleable to the first optical fiber 115 and an opposite end 712 coupled to a port 714 of a free space region 716 of the cAWG 710, and, second input waveguide portions (e.g., waveguide portions 110a, . . . , 110f) each having one end 718 coupled to different ports 720 of a multimode region 722 of the cAWG 710, and, the opposite ends (e.g., analogous to end 147 shown in FIG. 1) each optically coupled to different reflectors 130 of the reflective modulator 135.

The apparatus 100 also includes one or more of the output planar waveguides, wherein each of the output planar waveguides include a first output waveguide portion (e.g., portion 112) having one end (e.g., analogous to end 142 shown in FIG. 1) coupleable to the second optical fiber 112 and an opposite end 724 coupled to a different port 726 of the free space region 716, and, second output waveguide portions (e.g., waveguide portions 112a, . . . , 112f) each having one end 728 coupled to a different port 730 of the multimode region 722 and an opposite end (e.g., analogous to end 149 shown in FIG. 1) coupled to one of the different reflectors 130. Again, the opposite ends of the pairs of the second input waveguide portions and the second output planar waveguide portions (e.g., paired input and output waveguide second portion 107a, . . . , 107f) are tilted towards each other such that for each of the pairs, the optical signal 125 passing through the second input waveguide portion of the pair is directed from the PLC 105 to the one reflector 130 and from the one reflector 130 to the second output waveguide portion of the pair.

As further illustrated in FIG. 7, in some embodiments, the optical signal 125 is a wavelength division multiplexed optical signal (e.g., equally spaced wavelength channels $\lambda 1$, $\lambda 2$, $\lambda 3$, $\lambda 4$, $\lambda 5$, $\lambda 6$), and the cAWG 710 is configured to separate the wavelength division multiplexed optical signal into demultiplexed wavelength channel optical signals that are each directed to different ones of the second input waveguide portions of the pairs (e.g., channel $\lambda 1$ to second input waveguide portion 110a, channel $\lambda 2$ to second input waveguide portion 110b, etc. . . . ). The data modulated forms of the demultiplexed wavelength channel optical signals (e.g., channels $\lambda 1'$, $\lambda 2'$, $\lambda 3'$, $\lambda 4'$, $\lambda 5'$, $\lambda 6'$), are reflected to different ones of the second output planar waveguide portion of the pairs 107a, . . . , 107f (e.g., data modulated channel $\lambda 1'$ to second output waveguide portion 112a, data modulated channel $\lambda 2'$ to second output waveguide portion 112b, etc. . . . ).

The term cAWG, as used herein, refers to an AWG having at least two ports in the free space region of the AWG that are connected to the waveguides carrying the optical signals (e.g., ports 714, 726 of free space region 716 connecting to waveguides carrying the optical signals 125, 127), and, at least two ports of the multimode region that are connected to waveguides carrying the optical signals (e.g., ports 718, 728 of multimode region 722 connecting to waveguides carrying the optical signals 125, 127). One skilled in the pertinent art would understand how to arrange single-mode waveguide portion 735 of the cAWG 710 and the spacing between ports 714, 718, 726, 730 such that the wavelength division multiplexed optical signal 125 can be separated to different ports 720 connected to different ones of second input planar waveguide portions 110a, . . . of each pair 107a . . . , and be reflected back to the second output planar waveguide portions 112a, . . . of the same pair 107a . . . .

As further illustrated in FIG. 7, the cAWG can be configured such that, after traveling through the cAWG, the data modulated demultiplexed wavelength channel optical signals channels are combined to form a multiplexed data modulated form of the optical signal which passes through the first portion 112 of the output planar waveguide to the second optical fiber 117.

The use of a cAWG provides a low cost more compact configuration of wavechannel routing as compared using two separate AWGs where waveguides would be crossed so as to map optical signal from an input AWG to and output AWG.

The use of a cAWG in the apparatus, may appear to reduce the spectral carrying capacity of the apparatus, e.g., as compared to similarly configured non-cyclic AWGs.

Figure 8:
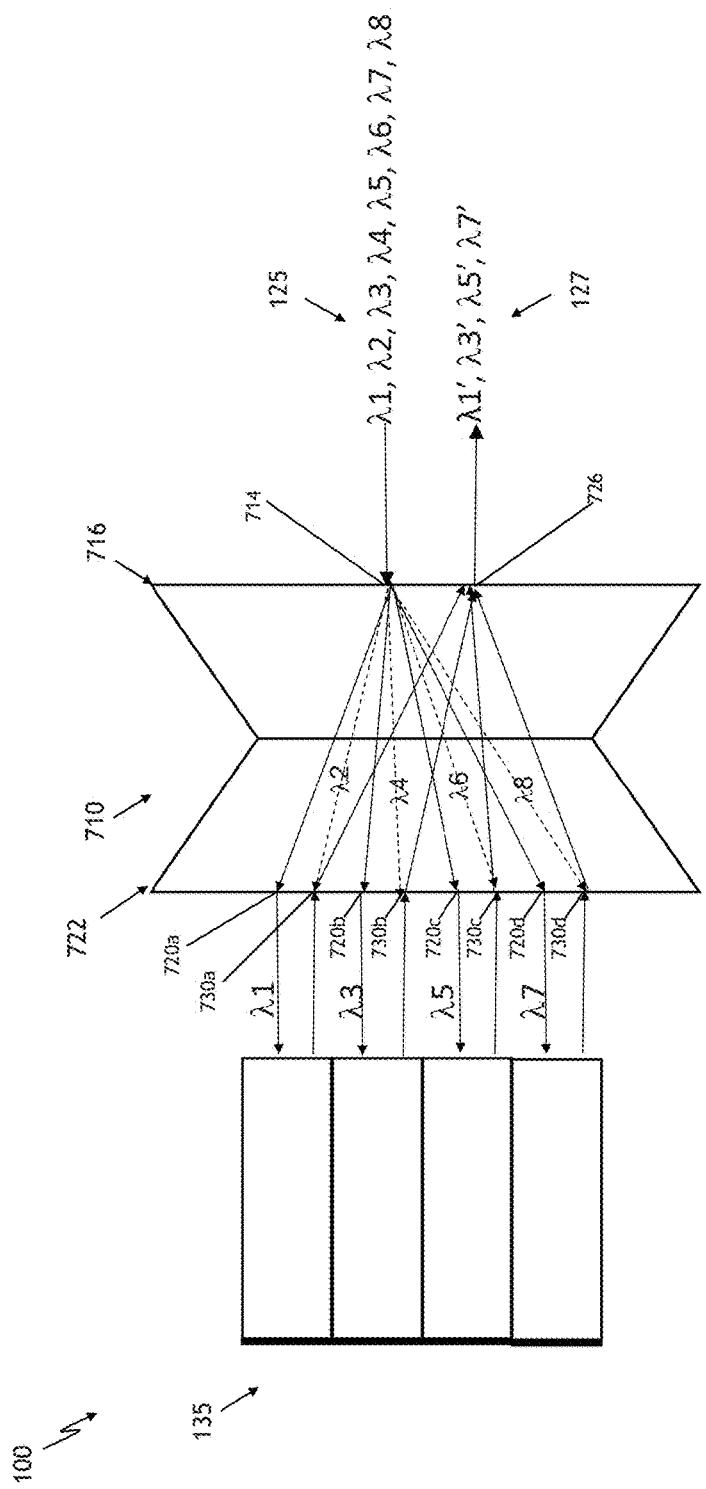
FIG. 8 presents a schematic depiction of example optical paths for different wavelength channels traveling through a cyclic AWG of the apparatus and optical paths between the cyclic AWG and a reflective modulator of the apparatus.

FIG. 8, presents a schematic depiction of example cyclic optical routing paths for wavelength channels traveling through an example cAWG 710 of the apparatus 100, including optical paths between the cAWG and a reflective modulator 135 of the apparatus. For clarity the planar waveguides coupled to the ports of the cAWG are not depicted. In this example the input optical signal 125 is assumed to include multiple channels $\lambda 1$, $\lambda 2$, $\lambda 3$, $\lambda 4$, $\lambda 5$, $\lambda 6$, $\lambda 7$, $\lambda 8$ evenly spaced by some characteristic frequency spacing $\Delta f$, and, the cAWG is configured to separate the channels to demultiplexed wavelength channels that are directed to separate ports 720*a*, 730*a*, 720*b*, 730*b* . . . , and, directed to and from the reflective modulator 135. The wavelength channels are reflected back from the reflective modulator 135 to the cAWG 710, in a cascading format with the reflected wavelength channels directed to the next incremental port of the AWG. As such, the data modulated form of λ1, (i.e., λ1') is reflected to the port 730*a* that λ2 is configured to be directed to, the data modulated form of λ3, (i.e., λ3') is reflected to the port 730*b* that λ4 is configured to be directed to, etc. Consequently, for this illustration, when the demultiplexed wavelength channels (λ1, λ2, λ3, λ4, λ5, λ6, λ7, λ8), separated from each other by a constant frequency difference, $\Delta f$, are passed into the second portions of the input waveguides (via ports 720*a*, 720*b* . . . ), then the reflective modulator reflects the data modulated demultiplexed wavelength channels (λ1', λ3', λ5', λ7'), that are separated from each other by the doubled frequency difference $2\Delta f$, back to the second portion of the output waveguides, and, exits the cAWG 710 as multiplex data modulated channels corresponding to output optical signal 127.

For the example illustrated in FIG. 8, cAWG is configured such that the spectral spacing of input channels (e.g., λ1, λ2, λ3, λ4, λ5, λ6, λ7, λ8 . . . ) and spectral spacing of the output channels (e.g., λ1, λ3, λ5, λ7 . . . ) has a 1:2 ratio (e.g., $\Delta f:2\Delta f$). However in other embodiments, the cAWG can be configured such that the spectral spacing input channels and the output channel spacing has a 1:3 ratio (e.g., input channels of e.g., λ1, λ2, λ3, λ4, λ5, λ6, λ7, λ8 . . . and output channels of λ1, λ4, λ7 . . . ) or a 1:4 ratio (e.g., input channels of e.g., λ1, λ2, λ3, λ4, λ5, λ6, λ7, λ8, λ9 . . . and output channels of λ1, λ5, λ9 . . . ).

Alternatively, for a cAWG configuration such as illustrated in FIG. 8, the input optical signal 125 could instead simply include only multiple channels λ1, λ3, λ5, λ7 evenly spaced by a characteristic spacing $2\Delta f$, in which case the output optical signal 127 would still include the data modulated channels λ1', λ3', λ5', λ7'. For example, if the cAWG 710 was designed to have a have 100 GHz port 720*a*, 730*a*, 720*b*, 730*b* . . . spacings (e.g., $\Delta f$=100 GHz) then wavelength channels included in the input optical would have 200 GHz channel spacings (e.g., $2\Delta f$=200 GHz).

As illustrated in FIGS. 7 and 8, the multimode region 722 of the cAWG 710 has port pairs (e.g., ports 720*a* and 730*a*, ports 720*b* and 730*b*, etc. . . . ) that are respectively coupled to one of the pairs of second input and output waveguide portions (e.g., waveguide pair 107*a* and waveguide pair 107*b*, respectively). The number of port pairs is equal to the number of data modulated wavelength channels reflected back to the cAWG 710 and out to the first output waveguide portion.

As illustrated in FIGS. 7 and 8, the free space region 716 of the cAWG 710 has a port pair (e.g., ports 714, 726) coupled to the first input waveguide portion 110 and the first output waveguide portion 112, respectively. Although the free space region 716 is depicted as being coupled to a single first input waveguide portion 110 and single first output waveguide portion 112, in other embodiment, multiple input waveguide portions, e.g., each carrying multi-channel optical signals 125, e.g., delivered from different input optical fibers 115, could be each connected to separate ports of the free space region 716. Similarly there could be multiple first output waveguide portions, each connected to separate ports of the free space region 716 and configured to carry different data modulated multi-channel optical signals 127, e.g., delivered to different output optical fibers 117.

For example in some embodiments, multi-channel optical signals 125 (e.g., λ1, λ2, λ3, λ4, . . . ) directed to a single input port 714 of the cAWG 710 can be data modulated such as described above and the multiple copies of the data modulated signal 127 can be passed to multiple different output ports 714 (e.g., copies of λ1', λ2', λ3', λ4', . . . to each output port) so as to broadcast the data modulated signal 127 to multiple different optical fibers 117 coupled to different waveguide portions 112 each coupled to the different output ports. For example, some embodiments, multiple copies of the multi-channel optical signals 125 can be directed of multiple input ports 714 (e.g., copies of λ1, λ2, λ3, λ4, . . . to each input port) and the subsequent data modulated signals can be directed to multiple different output ports 714 (e.g., copies of λ1', λ2', λ3', λ4', . . . to each output port). One skilled in the pertinent art would appreciate how the apparatus 100 could be configured to broadcast other combinations of multi-channel input and output optical signals.

Some embodiments of the apparatus 100 can benefit from the ports of the cAWG having preferential passband shapes to help reduce the effect of lost spectrum. For instance, in some embodiments the ports carrying non-modulated wavelength channel input (e.g., port 714 or ports 720*a*, 720*b* etc. . . . ) can be configured to have a narrow band pass (e.g., Gaussian shape). For instance, in some embodiments, the ports carrying data-modulated wavelength channel input (e.g., port 725 or ports 730*a*, 730*b* etc. . . . ) can be configured to have a wide band pass (e.g., flat-topped shape) to allow for the increased spectral bandwidth of the channels after modulation.

One skilled in the pertinent art would be familiar with the fabrication procedures to form the planar waveguides and cAWG on a PLC chip.

As further illustrated in FIG. 7 some embodiments of the PLC 105 can further include a test waveguide 740 to measure the fabrication process after dicing to form the discrete PLC 105, and some embodiments of the cAWG 710 can further include a test port 745 to measure wavelength after fabricating the cAWG 710 on the PLC 106.

Figure 9:
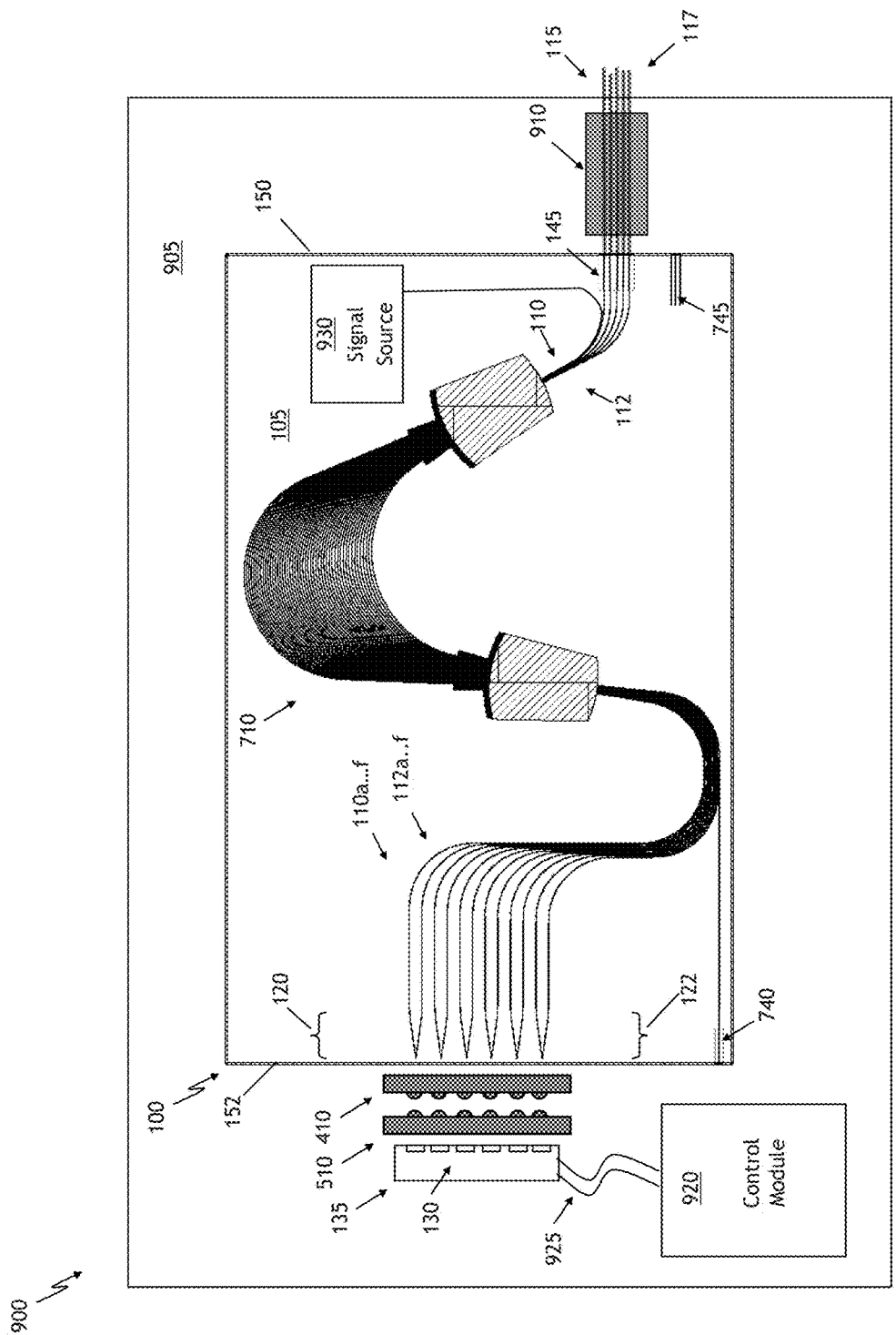
FIG. 9 presents a plan view of an example optical package of the disclosure, the package including an optical apparatus such as any of embodiments of the optical apparatuses discuss in the context of FIGS. 1-8.

Another embodiment of the disclosure is an optical system, e.g., an optical transmitter package system. FIG. 9 presents a plan view of an example optical package 900 of the disclosure.

With continuing reference to FIGS. 1-8, as illustrated in FIG. 9 the system 900 can include a package substrate 905 (e.g., circuit board) and a reflective modulator 135 mounted on the package substrate 905. The system 900 can include any of the embodiments of the optical apparatus 100 discussed in the context of FIGS. 1-8. For instance, the system can include a PLC 105 mounted on the package substrate 905, the PLC 105 having an input planar waveguide (e.g., waveguide portions 110, 110*a* . . . ) and an output planar waveguide (e.g., waveguide portion 112, 112*a* . . . ) thereon. The input planar waveguide is optically coupleable, or coupled, to one or more first optical fibers 115 and the output optical waveguide is optically coupleable to one or more second optical fibers.

As discussed in the context of FIGS. 1-5 end segments 120 of the input planar waveguide and end segments 122 the output planar waveguide are tilted towards each other such that an optical signal passed through the input planar waveguide is directed from the planar lightwave circuit to a reflector of a reflective modulator 135 (e.g., one reflector of a reflector array 130), and, the reflector is configured to reflect a data modulated form of the optical signal to the end segment 122 of the output planar waveguide and through the output planar waveguide.

As illustrated in FIG. 9, in some embodiments the first and second optical fibers 115, 117 can be mounted on the package substrate 905, e.g., to facilitate edge coupling to the input and output planar waveguides 110, 112. For instance the fibers can be placed in a V-groove assembly 910 to facilitate defining the pitch (e.g., at least about distance 165) between fibers. Then the V-groove assembly 910 can is located at or near the edge 150 of the PLC 105 and optically aligned to the ends of the WGs (e.g., at port 145) after which the PLC 105 fibers 115, 117 and V-groove assembly 910 can be bonded (e.g., glued) together to maintain the alignment. In other embodiments, to facilitate providing a more compact and lower cost package, the V-groove assembly can be formed on or in the PLC 105 itself and the fibers after positioning in the V-grooves, can be bonded to PLC 105.

As illustrated in FIG. 9, in some embodiments of the system 900, the reflective modulator 135 is an electro-absorptive modulator having an array of the reflectors 130, and, the system 900 can further include a control module 920 on the package substrate 905. The control module 920 can be configured to control the modulation of the optical signal by reflective modulator.

For instance, in some embodiment, the control module 920 (e.g., configured as an integrated circuit) can be flip-chip bonded to the package substrate 905 (or a sub-mount on the substrate 905) in a region of the substrate 905 having electrical traces 925 connecting to the modulator 135. For instance, the control module 920 can be configured to apply electric fields to the quantum well regions of the reflectors 130 to thereby change the reflectivity of reflector 130 so as to encode, e.g., binary data into the optical signals 125 to form the data modulated the optical signals 127.

As illustrated in FIG. 9, some embodiments of the system 900 further include a cAWG 710 on the PLC 105. The cAWG 710 can include any of the embodiments disclosed in the context of FIGS. 7 and 8.

As illustrated in FIG. 9 in some embodiments, the system 900 can further include an optical signal source 930 located on the substrate 105 and coupled via one of the input waveguides 110 to an input port of the cAWG 710 (e.g., port 714 of the frees space region 716 analogous to that shown in FIG. 8). Embodiments of the source 930 could include any optical frequency comb source including, but not limited to, a mode locked laser, a directly modulated laser (DML), or reflective semiconductor optical amplifier (ROSA).

Those skilled in the art to which this application relates will appreciate that other and further additions, deletions, substitutions and modifications may be made to the described embodiments.

What is claimed is:

1. An optical apparatus, comprising:
   a reflective optical modulator;
   an integrated planar lightwave circuit having one or more pairs of input and output planar waveguides thereon, wherein:
   the input planar waveguide is optically coupleable to a first optical fiber and the output optical waveguide is optically coupleable to a second optical fiber,
   end segments of the input planar waveguide and the output planar waveguide are tilted towards each other such that the input planar waveguide is able to direct an optical signal from the planar lightwave circuit to the reflective optical modulator, and
   the reflective optical modulator is configured to data modulate the optical signal and transmit said data modulated optical signal to the end segment of the output planar waveguide; and
   a cyclic arrayed waveguide grating wherein each of the input planar waveguides is optically coupled to first coupler region on one side of the cyclic arrayed waveguide grating and each of the output planar waveguides is optically coupled to a second coupler region on an opposite side of the cyclic arrayed waveguide grating.

2. The apparatus of claim 1, wherein non-end segment portions the input planar waveguide and the output planar waveguide are separated by a distance in the range from 100 to 500 microns.

3. The apparatus of claim 1, the end segments of the input planar waveguide and the output planar waveguide are tilted towards each other to form an acute angle therebetween.

4. The apparatus of claim 1, wherein ends of the end segments of the input planar waveguide core and the output planar waveguide core of one of the one or more pairs are offset by a distance in the range from about 0.1 to 1 microns.

5. The apparatus of claim 1, wherein ends of the end segments of the input planar waveguide core and of the output planar waveguide core one of the one or more pairs are in contact with each other at an edge of the planar lightwave circuit.

6. The apparatus of claim 1, wherein the reflective optical modulator is an electro-absorptive modulator.

7. The apparatus of claim 1, wherein the first coupler region is a free space region of the cyclic arrayed waveguide grating and the second coupler region is a multimode region of the cyclic arrayed waveguide grating.

8. The apparatus of claim 1, wherein: the optical signal is a wavelength division multiplexed optical signal and the cyclic arrayed waveguide grating is configured to separate the wavelength division multiplexed optical signal into demultiplexed wavelength channel optical signals that are each directed to different ones of the second input waveguide portions of the pairs, and
   the data modulated forms of the demultiplexed wavelength channel optical signals are reflected to different ones of the second output planar waveguide portion of the same pairs.

9. The apparatus of claim 1, wherein the first coupler region of the cyclic arrayed waveguide grating has first and second port pairs respectively coupled to one of the pairs the second input waveguide and the second output waveguide portions.

10. The apparatus of claim 1, wherein the cyclic arrayed waveguide grating is a 2 by N cyclic arrayed waveguide grating.

11. An optical apparatus, comprising:
    a reflective optical modulator;
    an integrated planar lightwave circuit having one or more pairs of input and output planar waveguides thereon, wherein:
    the input planar waveguide is optically coupleable to a first optical fiber and the output optical waveguide is optically coupleable to a second optical fiber,
    end segments of the input planar waveguide and the output planar waveguide are tilted towards each other such that the input planar waveguide is able to direct an optical signal from the planar lightwave circuit to the reflective optical modulator, and
    the reflective optical modulator is configured to data modulate the optical signal and transmit said data modulated optical signal to the end segment of the output planar waveguide; and
    a pair of lens configured to image the optical signal from the end of the tilted end segment of input planar waveguide into the reflective modulator and to image the data modulated optical signal from the reflective optical modulator onto the end of the tilted end segment of the output planar waveguide of the same one of the one or more pairs.

12. An optical system, comprising:
a package substrate;
a reflective optical modulator mounted on the package substrate; and
an integrated planar lightwave circuit mounted on the package substrate, the planar lightwave circuit having an input planar waveguide and an output planar waveguide thereon, wherein:
  the input planar waveguide is optically coupleable to one or more first optical fibers and the output planar waveguide is optically coupleable to one or more second optical fibers, and
  end segments of the input planar waveguide and the output planar waveguide are tilted towards each other such that an optical signal passed through the input planar waveguide is directed from the planar lightwave circuit into the reflective optical modulator configured to data modulate the optical signal and direct said data modulated optical signal to the end segment of the output planar waveguide; and
  a cyclic arrayed waveguide grating wherein each of the input planar waveguides is optically coupled to a first coupler region on one side of the cyclic arrayed waveguide grating and each of the output planar waveguides is optically coupled to a second coupler region on an opposite side of the cyclic arrayed waveguide grating.

13. The system of claim 12, wherein the first and second optical fibers are mounted on the package substrate.

14. The system of claim 12, wherein the reflective optical modulator is an electro-absorptive modulator having an array of the reflectors.

15. The system of claim 12, further including a control module on the package, the control module being configured to electrically drive the data modulation of the optical signal by reflective optical modulator.

16. The system of claim 12, wherein the first coupler region has first and second port pairs respectively coupled to one of the pairs the second input waveguide and the second output waveguide portions.

17. The system of claim 12, wherein the first coupler region is a free space region of the cyclic arrayed waveguide grating and the second coupler region is a multimode region of the cyclic arrayed waveguide grating.

18. The system of claim 12, wherein the cyclic arrayed waveguide grating is a 2 by N cyclic arrayed waveguide grating.

19. An optical apparatus, comprising:
a reflective optical modulator;
an integrated planar lightwave circuit having one or more pairs of input and output planar waveguides thereon, wherein:
  the input planar waveguide is optically coupleable to a first optical fiber and the output optical waveguide is optically coupleable to a second optical fiber,
  end segments of the input planar waveguide and the output planar waveguide are tilted towards each other such that the input planar waveguide is able to direct an optical signal from the planar lightwave circuit to the reflective optical modulator, and
  the reflective optical modulator is configured to data modulate the optical signal and transmit said data modulated optical signal to the end segment of the output planar waveguide; and
  a pair of lens configured to image the optical signal from the end of the tilted end segment of input planar waveguide on to the reflector of the reflective modulator and to image the data modulated optical signal from the reflector on to the end of the tilted end segment of the output planar waveguide.

20. An optical system, comprising:
a package substrate;
a reflective optical modulator mounted on the package substrate; and
an integrated planar lightwave circuit mounted on the package substrate, the planar lightwave circuit having an input planar waveguide and an output planar waveguide thereon, wherein:
  the input planar waveguide is optically coupleable to one or more first optical fibers and the output planar waveguide is optically coupleable to one or more second optical fibers, and
  end segments of the input planar waveguide and the output planar waveguide are tilted towards each other such that an optical signal passed through the input planar waveguide is directed from the planar lightwave circuit into the reflective optical modulator configured to data modulate the optical signal and direct said data modulated optical signal to the end segment of the output planar waveguide; and
  a lens array, each lens of the lens array is configured to focus or image a different channel of the optical signal from one of the second portions of the input waveguide onto one of the reflectors of the reflective modulator.

21. An apparatus, comprising:
a substrate;
a plurality of reflective optical modulators on the substrate; and
an arrayed waveguide grating device on the substrate, the arrayed waveguide grating device having a pair of first ports and a plurality of pairs of second ports, the arrayed waveguide grating device optically connecting each second port to the pair of first ports in a wavelength-cyclic manner, wherein:
  each of the reflective optical modulators is connected to receive light from one of the second ports of a corresponding one of the pairs and to transmit light to the other of the second ports of the same corresponding one of the pairs.

22. The apparatus of claim 21, wherein the arrayed waveguide device is an integrated planar optical device.

23. The apparatus of claim 22, wherein the second ports of each of the one of the pairs include end segments of planar optical waveguides that tilt towards each other near an edge of the integrated planar wave guide device.

24. The apparatus of claim 23, wherein the reflective optical modulators form an array along the edge.

25. The apparatus of claim 23, wherein one or more lenses are located between the edge and the array.

26. The apparatus of claim 24, wherein one or more lenses are located between the edge and the array.

27. The apparatus of claim 23, wherein a corresponding lens is located between the edge and each one of the reflective optical modulators of the array.

28. The apparatus of claim 24, wherein a corresponding lens is located between edge and each ones of the reflective optical modulators of the array.

29. The apparatus of claim 21, wherein the reflective optical modulators are electro-absorption optical modulators.

30. The apparatus of claim 23, wherein the reflective optical modulators are electro-absorption optical modulators.

31. The apparatus of claim 24, wherein the reflective optical modulators are electro-absorption optical modulators.

* * * * *